United States Patent
Baird et al.

(10) Patent No.: US 7,980,066 B2
(45) Date of Patent: Jul. 19, 2011

(54) THERMAL MANAGEMENT FOR AN INTERNAL COMBUSTION ENGINE TO OPTIMIZE DIESEL PARTICULATE FILTER REGENERATION EVENTS

(75) Inventors: Matthew Thomas Baird, Canton, MI (US); Amr Mohamed Radwan, Canton, MI (US); Kevin Dean Sisken, Saline, MI (US); Bryant Chan Pham, Canton, MI (US)

(73) Assignee: Detroit Diesel Corporation, Detroit, MI (US)

( * ) Notice: Subject to any disclaimer, the term of this patent is extended or adjusted under 35 U.S.C. 154(b) by 880 days.

(21) Appl. No.: 11/959,859

(22) Filed: Dec. 19, 2007

(65) Prior Publication Data

US 2009/0164108 A1   Jun. 25, 2009

(51) Int. Cl.
*F01N 3/00* (2006.01)
*F01N 3/10* (2006.01)
*F01N 3/02* (2006.01)

(52) U.S. Cl. ............... 60/295; 60/274; 60/286; 60/297; 60/303; 60/311

(58) Field of Classification Search ............. 60/273, 60/274, 285, 286, 295, 297, 303, 311; 701/110, 701/117, 119, 201, 202
See application file for complete search history.

(56) References Cited

U.S. PATENT DOCUMENTS

| | | | |
|---|---|---|---|
| 6,032,461 A * | 3/2000 | Kinugasa et al. | 60/295 |
| 6,871,489 B2 | 3/2005 | Tumati et al. | |
| 6,910,329 B2 * | 6/2005 | Bunting et al. | 60/297 |
| 2006/0096281 A1 | 5/2006 | Huang | |
| 2007/0214772 A1 | 9/2007 | England | |

* cited by examiner

*Primary Examiner* — Thomas E Denion
*Assistant Examiner* — Audrey Klasterka
(74) *Attorney, Agent, or Firm* — Bills C. Panagos; Rader, Fishman & Grauer PLLC

(57) ABSTRACT

A method to operate an electronically controlled internal combustion engine that recognizes when thermal management mode of operation is being applied to an engine but is not attaining desired exhaust temperature for aftertreatment. When the Engine Control System (ECS) recognizes that the engine in operating in thermal management mode in a futile effort, the ECS aborts thermal management mode and returns to normal operating mode.

7 Claims, 2 Drawing Sheets

THERMAL MANAGEMENT FOR AN INTERNAL COMBUSTION ENGINE TO OPTIMIZE DIESEL PARTICULATE FILTER REGENERATION EVENTS

TECHNICAL FIELD OF THE INVENTION

Current legislative mandates require operation of heavy duty diesel engine in a clean and efficient manner. Emissions, particularly particulate matter emissions (PM) and soot can be captured in a diesel particulate filter (DPF) in the exhaust system of vehicles equipped with electronically controlled heavy duty diesel engines. In order to meet the emission requirements thermal management strategies are implemented in the operation of diesel engines that optimizes the regeneration of the DPF. However, these strategies may not always provide for the most optimal fuel economy, which is demanded by vehicle and fleet operators. Thermal management strategies are implemented to increase the heat in the exhaust system to facilitate DPF regeneration, however, during low engine speed and load or low vehicle speed conditions thermal management does not always result in efficient DPF regeneration. Rather, thermal management mode of operation in such low engine speed and load, and low vehicle speed conditions may result in unnecessary consumption of fuel without any effect on raising the exhaust temperature to a level sufficient to permit efficient DPF regeneration.

There is a need to effect a strategy to implement a thermal management feature that may be used for over the road and high idle operating conditions. There is a need to implement a thermal management feature that blocks implementation of thermal management operating mode and transition the engine to more optimal operating conditions as it relates to particulate and soot production. The reduction in both of these exhaust constituents will provide an optimal environment for the aftertreatment devices.

By controlling PM and soot, the regeneration event will not generate extremely high temperature that may shorten the life of the DPF.

These and other aspects will become apparent upon a reading of the following specification and claims.

BRIEF SUMMARY OF THE INVENTION

In one embodiment, the present invention relates to a method to operate an internal combustion engine having an electronic engine control system (ECS) with memory, and an aftertreatment exhaust system with a diesel oxidation catalyst (DOC) and a diesel particulate filter (DPF). The method comprises the steps of
  determining engine operational status;
  determining whether engine thermal management is operating;
  determining whether engine thermal management is required for DPF regeneration;
  discontinuing engine thermal management if not required for DPF regeneration;
  determining engine speed, engine load, vehicle speed, exhaust temperature, high idle regeneration status, and engine governor status to determine if operating condition changes are above a predetermined threshold for a predetermined period of time; and
    re-initiating thermal management.
  If thermal management is not operating, the engine control system (ECS) continues normal engine operation. Similarly, if thermal management is required for DPF regeneration, the engine continues operation in thermal management mode.

If engine speed, engine load, vehicle speed, engine governor status, exhaust temperature and high idle regeneration are below a predetermined threshold for a predetermined period of time, the engine control system (ECS) reinitiates determination of engine speed, engine load, vehicle speed and governor status after a predetermined period of time has elapsed, periodically on a continuous basis.

Generally, the method of the present invention is implemented. In addition, this logic is used during high idle regeneration to exit thermal management when criteria are met during on highway operating DPF regeneration events.

For highway operation, thermal management engine operating mode is discontinued when engine speed is low, engine load is low, vehicle speed is low, exhaust temperature is below light off temperature, and high idle regeneration may or may not operate.

DETAILED DESCRIPTION OF THE INVENTION

Figure 1:
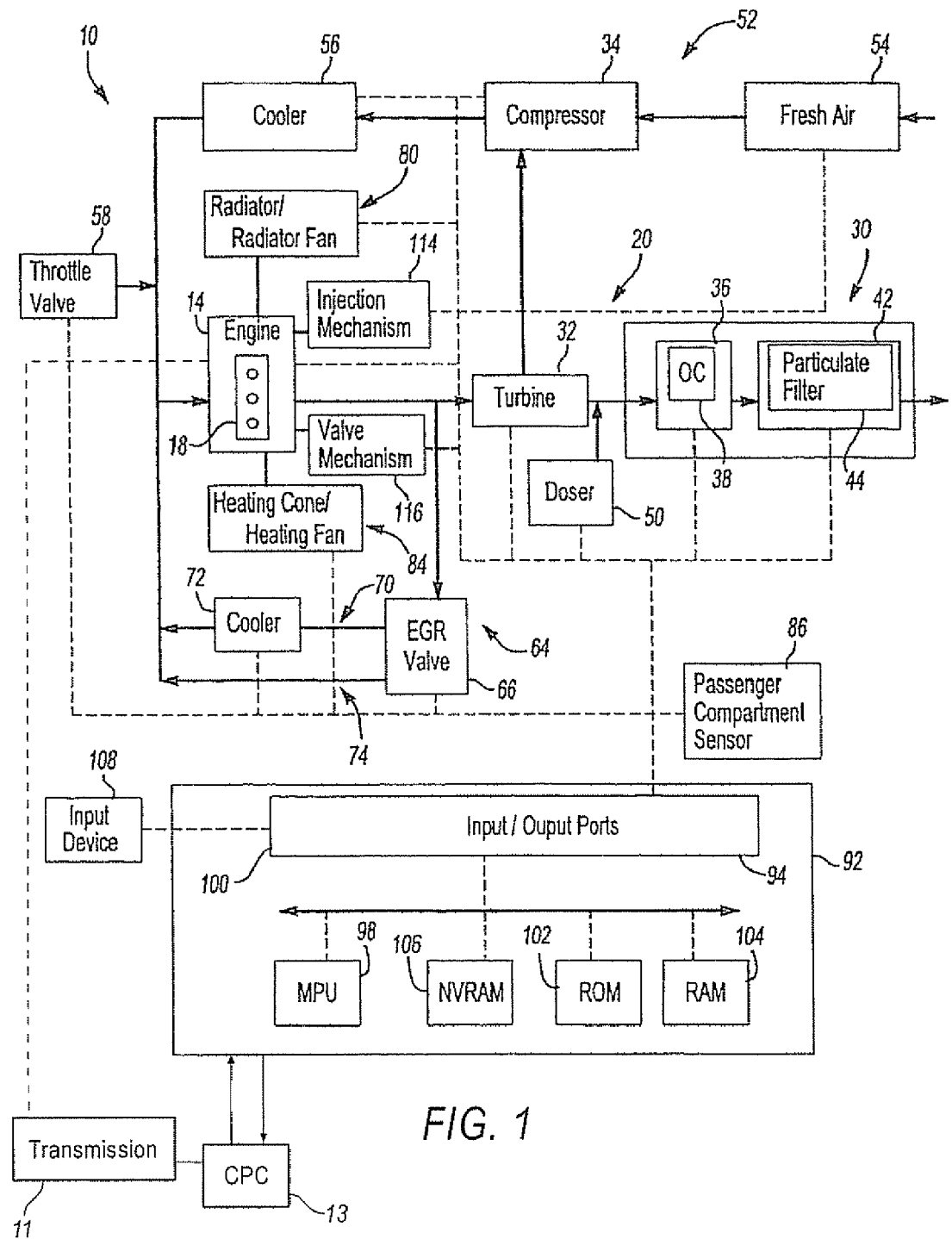
FIG. 1 is a schematic representation of a heavy duty diesel engine used in a vehicle according to one embodiment of the present invention.

FIG. 1 illustrates a vehicle powertrain system 10 in accordance with one non-limiting aspect of the present invention. The system 100 may provide power for driving any number of vehicles, including on-highway trucks, construction equipment, marine vessels, stationary generators, automobiles, trucks, tractor-trailers, boats, recreational vehicle, light and heavy-duty work vehicles, and the like.

The system 10 may be referred to as an internal combustion driven system wherein fuels, such as gasoline and diesel fuels, are burned in a combustion process to provide power, such as with a spark or compression ignition engine 14. The engine 14 may be a diesel engine that includes a number of cylinders 18 into which fuel and air are injected for ignition as one skilled in the art will appreciate. The engine 14 may be a multi-cylinder compression ignition internal combustion engine, such as a 4, 6, 8, 12, 16, or 24 cylinder diesel engines, for example. It should be noted, however, that the present invention is not limited to a particular type of engine or fuel. The engine is cooperatively engaged by transmission 11 by a flywheel and either a clutch or a torque converter as is customary with engines and transmissions. The transmission has an ECU 13, which is in data communication with the engine control system, as will herein after be described.

Exhaust gases generated by the engine 14 during combustion may be emitted through an exhaust system 20. The exhaust system 20 may include any number of features, including an exhaust manifold and passageways to deliver the emitted exhaust gases to a particulate filter assembly 30, which in the case of diesel engines is commonly referred to as a diesel particulate filter. Optionally, the system 20 may include a turbocharger proximate the exhaust manifold for compressing fresh air delivery into the engine 14. The turbocharger, for example, may include a turbine 32 and a compressor 34 such as a variable geometry turbocharger (VGT) and/or a turbo compound power turbine. Of course, the present invention is not limited to exhaust systems having turbochargers or the like.

The particulate filter assembly 30 may be configured to capture particulates associated with the combustion process. In more detail, the particulate filter assembly 30 may include an oxidation catalyst (OC) canister 36, which in includes an OC 38, and a particulate filter canister 42, which includes a particulate filter 44. The canisters 36, 42 may be separate components joined together with a clamp or other feature such that the canisters 36, 42 may be separated for servicing and other operations. Of course, the present invention is not intended to be limited to this exemplary configuration for the particulate filter assembly 30. Rather, the present invention contemplates the particulate filter assembly including more or less of these components and features. In particular, the present invention contemplates the particulate filter assembly 30 including only the particulate filter 44 and not necessarily the OC canister 36 or substrate 38 and that the particulate filter 44 may be located in other portions of the exhaust system 20, such as upstream of the turbine 32.

The OC 38 which for diesel engines is commonly referred to as a diesel oxidation catalyst, may oxidize hydrocarbons and carbon monoxide included within the exhaust gases so as to increase temperatures at the particulate filter 44. The particulate filter 44 may capture particulates included within the exhaust gases, such as carbon, oil particles, ash, and the like, and regenerate the captured particulates if temperatures associated therewith are sufficiently high. In accordance with one non-limiting aspect of the present invention, one object of the particulate filter assembly 30 is to capture harmful carbonaceous particles included in the exhaust gases and to store these contaminates until temperatures at the particulate filter 44 favor oxidation of the captured particulates into a gas that can be discharged to the atmosphere.

The OC and particulate filter canisters 36, 42 may include inlets and outlets having defined cross-sectional areas with expansive portions there between to store the OC 38 and particulate filter 44, respectively. However, the present invention contemplates that the canisters 36, 42 and devices therein may include any number configurations and arrangements for oxidizing emissions and capturing particulates. As such, the present invention is not intended to be limited to any particular configuration for the particulate filter assembly 30.

To facilitate oxidizing the capture particulates, a doser 50 may be included to introduce fuel to the exhaust gases such that the fuel reacts with the OC 38 and combusts to increase temperatures at the particulate filter 44, such as to facilitate regeneration. For example, one non-limiting aspect of the present invention contemplates controlling the amount of fuel injected from the doser as a function of temperatures at the particulate filter 44 and other system parameters, such as air mass flow, EGR temperatures, and the like, so as to control regeneration. However, the present invention also contemplates that fuel may be included within the exhaust gases through other measures, such as by controlling the engine 14 to emit fuel with the exhaust gases.

An air intake system 52 may be included for delivering fresh air from a fresh air inlet 54 through an air passage to an intake manifold for introduction to the engine 14. In addition, the system 52 may include an air cooler or charge air cooler 56 to cool the fresh air after it is compressed by the compressor 34. Optionally, a throttle intake valve 58 may be provided to control the flow of fresh air to the engine 14. Optionally, the throttle intake valve 58 may also be provided to control the flow of EGR gases to the engine 14 or control both flesh air and EGR gases 64 to the engine 14. The throttle valve 58 may be a manually or electrically operated valve, such as one which is responsive to a pedal position of a throttle pedal operated by a driver of the vehicle. There are many variations possible for such an air intake system and the present invention is not intended to be limited to any particular arrangement. Rather, the present invention contemplates any number of features and devices for providing fresh air to the intake manifold and cylinders, including more or less of the foregoing features.

An exhaust gas recirculation (EGR) system 64 may be optionally provided to recycle exhaust gas to the engine 14 for mixture with the fresh air. The EGR system 64 may selectively introduce a metered portion of the exhaust gasses into the engine 14. The EGR system 64, for example, may dilute the incoming air charge and lower peak combustion temperatures to reduce the amount of oxides of nitrogen produced during combustion. The amount of exhaust gas to be re-circulated may be controlled by controlling an EGR valve 66 and/or in combination with other features, such as the turbo-charger. The EGR valve 66 may be a variable flow valve that is electronically controlled. There are many possible configurations for the controllable EGR valve 66 and embodiments of the present invention are not limited to any particular structure for the EGR valve 66.

The EGR system 64 in one non-limiting aspect of the present invention may include an EGR cooler passage 70, which includes an EGR cooler 72, and an EGR cooler bypass 74. The EGR valve 66 may be provided at the exhaust manifold to meter exhaust gas through one or both of the EGR cooler passage 70 and bypass 74. Of course, the present invention contemplates that the EGR system 64 may include more or less of these features and other features for recycling exhaust gas. Accordingly, the present invention is not intended to be limited to any one FOR system and contemplates the use of other such systems, including more or less of these features, such as an EGR system having only one of the EGR cooler passage or bypass.

A cooling system 80 may be included for cycling the engine 14 by cycling coolant there through. The coolant may be sufficient for fluidly conducting away heat generated by the engine 14, such as through a radiator. The radiator may include a number of fins through which the coolant flows to be cooled by air flow through an engine housing and/or generated by a radiator fan directed thereto as one skilled in the art will appreciated. It is contemplated, however, that the present invention may include more or less of these features in the cooling system 80 and the present invention is not intended to be limited to the exemplary cooling system described above.

The cooling system 80 may operate in conjunction with a heating system 84. The heating system 84 may include a heating core, a heating fan, and a heater valve. The heating core may receive heated coolant fluid from the engine 14 through the heater valve so that the heating fan which may be electrically controllable by occupants in a passenger area or cab of a vehicle, may blow air warmed by the heating core to the passengers. For example, the heating fan may be controllable at various speeds to control an amount of warmed air blown past the heating core whereby the warmed air may then be distributed through a venting system to the occupants. Optionally, sensors and switches 86 may be included in the passenger area to control the heating demands of the occupants. The switches and sensors may include dial or digital switches for requesting heating and sensors for determining whether the requested heating demand was met. The present invention contemplates that more or less of these features may be included in the heating system and is not intended to be limited to the exemplary heating system described above.

A controller 92, such as an electronic control module or engine control module, may be included in the system 10 to control various operations of the engine 14 and other system or subsystems associated therewith, such as the sensors in the exhaust, EGR, and intake systems. Various sensors may be in electrical communication with the controller via input/output ports 94. The controller 92 may include a microprocessor unit (ECU) 98 in communication with various computer readable storage media via a data and control bus 100. The computer readable storage media may include any of a number of known devices which function as read only memory 102, random access memory 104, and non-volatile random access memory 106. A data, diagnostics, and programming input and output device 108 may also be selectively connected to the controller via a plug to exchange various information therebetween. The device 108 may be used to change values within the computer readable storage media, such as configuration settings, calibration variables, instructions for EGR, intake, and exhaust systems control and others.

The system 10 may include an injection mechanism 114 for controlling fuel and/or air injection for the cylinders 18. The injection mechanism 114 may be controlled by the controller 92 or other controller and comprise any number of features, including features for injecting fuel and/or air into a common-rail cylinder intake and a unit that injects fuel and/or air into each cylinder individually. For example, the injection mechanism 114 may separately and independently control the fuel and/or air injected into each cylinder such that each cylinder may be separately and independently controlled to receive varying amounts of fuel and/or air or no fuel and/or air at all. Of course, the present invention contemplates that the injection mechanism 114 may include more or less of these features and is not intended to be limited to the features described above.

The system 10 may include a valve mechanism 116 for controlling valve timing of the cylinders 18, such as to control air flow into and exhaust flow out of the cylinders 18. The valve mechanism 116 may be controlled by the controller 92 or other controller and comprise any number of features, including features for selectively and independently opening and closing cylinder intake and/or exhaust valves. For example, the valve mechanism 116 may independently control the exhaust valve timing of each cylinder such that the exhaust and/or intake valves may be independently opened and closed at controllable intervals, such as with a compression brake. Of course, the present invention contemplates that the valve mechanism may include more or less of these features and is not intended to be limited to the features described above.

In operation, the controller 92 receives signals from various engine/vehicle sensors and executes control logic embedded in hardware and/or software to control the system 10. The computer readable storage media may, for example include instructions stored thereon that are executable by the controller 92 to perform methods of controlling all features and sub-systems in the system 10. The pro-ram instructions may be executed by the controller in the ECU 98 to control the various systems and subsystems of the engine and/or vehicle through the input/output ports 94. In general, the dashed lines shown in FIG. 1 illustrate the optional sensing and control communication between the controller and the various components in the powertrain system. Furthermore, it is appreciated that any number of sensors and features may be associated with each feature in the system for monitoring and controlling the operation thereof.

In one non-limiting aspect of the present invention, the controller 92 may be the DDEC controller available from Detroit Diesel Corporation, Detroit, Mich. Various other features of this controller are described in detail in a number of U.S. patents assigned to Detroit Diesel Corporation. Further, the controller may include any of a number of programming and processing techniques or strategies to control an), feature in the system 10. Moreover, the present invention contemplates that the system may include more than one controller, such as separate controllers for controlling system or sub-systems, including an exhaust system controller to control exhaust gas temperatures, mass flow rates, and other features associated therewith. In addition, these controllers may include other controllers besides the DDEC controller described above.

In accordance with one non-limiting aspect of the present invention, the controller 92 or other feature, may be configured for permanently storing emission related fault codes in memory that is not accessible to unauthorized service tools. Authorized service tools may be given access by a password and in the event access is given, a log is made of the event as well as whether any changes that are attempted to made to the stored fault codes. It is contemplated that any number of faults may be stored in permanent memory, or rewritable memory, and that preferably such faults are stored in rewritable memory.

Figure 2:
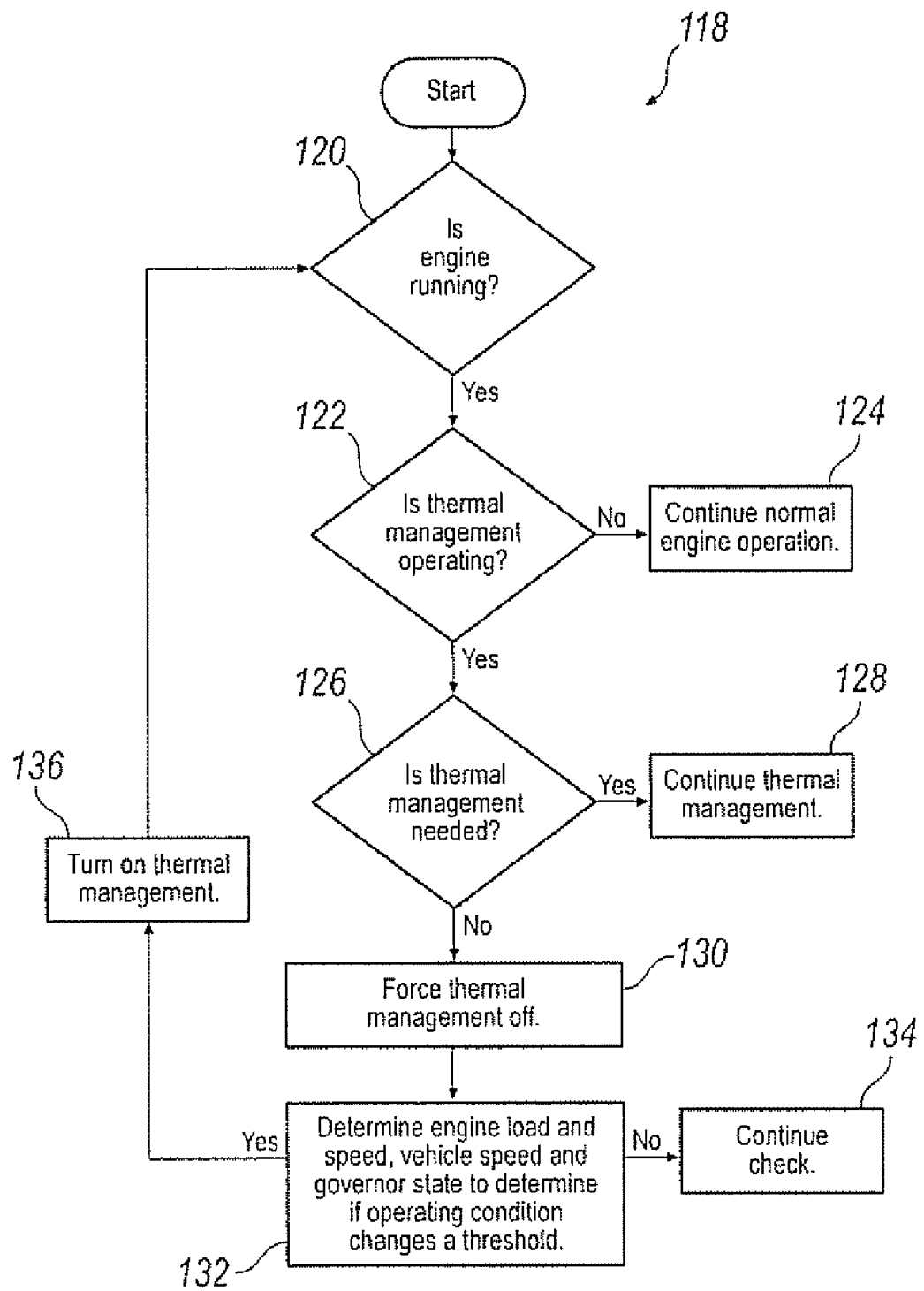
FIG. 2 is a software flowchart of one method according to one embodiment of the present invention.

FIG. 2 is a schematic representation of the software flowchart of one method 118 according to one embodiment of the present invention. Specifically, step 120 is operating the engine. One the engine has been operating for a predetermined period of time, step 122 is determining whether the engine is operating in a thermal management mode. If not, step 124 is continue to operate the engine in normal operating mode. If it is determined that the engine is operating in thermal management mode, step 126 is determining whether thermal management operating mode is justified or required. If yes, step 128 is continue to operate the engine in thermal management mode. If it is determined that is it not necessary to operate the engine in thermal management mode, step 130 is to discontinue thermal management mode. This determination may be made by determining that exhaust temperature is not being attained for the exhaust aftertreatment device, such as the DPF. When the thermal mode operation is discontinued, the engine returns to normal operating modes by returning to normal timing, i.e., beginning of injection (BOI) fueling, quantity, and air mass flow, etc. Step 132 is determining engine speed, engine load vehicle speed, governor status, exhaust temperature, high idle regeneration status, and engine governor status to determine if operating condition changes are above a predetermined threshold for a predetermined period of time. If not, step 134 is the engine control system (ECS) continues to check these operating parameters on a periodic continuous basis. If the determination in step 132 is yes, step 136 is re-initiate engine operation in thermal management mode. The software them loops back to step 120, and the system continuously makes the determination whether to continue thermal management mode of operation for the engine.

By means of the methods of the present invention, it can be seen that the strategy recognizes when thermal management is being applied but is not attaining a desired exhaust temperature for the aftertreatment, particularly the DOC and the DPF. When the method recognizes that operating the engine in thermal management mode is a futile effort, the method as disclosed aborts thermal management and returns to normal engine operating modes i.e., BOI, timing, fueling quantity, air mass flow, etc. It has been seen that these conditions may occur when the engine is operating in steady idle and fast idle conditions. In addition, some low load, low rpm steady operation modes may be seen to exhibit these conditions. Blocking of thermal management mode of operation and transitioning calibration maps in the ECS memory forces the engine back into more optimal operating conditions as it relates to hydrocarbon, PM and soot production. This reduction in these exhaust constituents provides an optimal environment for the aftertreatment DPF. For example, reduced hydrocarbon helps lower the amount of hydrocarbon absorbed into the aftertreatment substrates. This reduction in hydrocarbon absorption can present component failure the next time exhaust temperatures elevate and the hydrocarbon begins to convert. This sudden conversion in hydrocarbon can lead to high temperatures and high temperature gradients which can cause failure in aftertreatment substrates. In addition, the reduction in soot production allows the filter to operate at current engine speed/load on maps stored in ECS memory for a longer period of time as a result of the filter not reaching soot capacity limits as quickly. The methods of the present invention may be used for over the road operation and high idle regeneration events. During high idle regeneration events, the feature will self terminate the high idle regeneration event if the controller determines that the thermal management strategy is not achieving exhaust temperatures in a timely manner. The self abort aspect prevents the operator from entering high idle regeneration events that could run indefinitely.

The words used in the specification are understood to be words of description, not words of limitation. Those skilled in the art recognize that many variations and modifications are possible without departing for the scope and spirit of the invention as set forth in the appended claims.

What is claimed as new and desired to be protected by Letters Patent of the United States is:

1. A method to optimize regeneration of a diesel particulate filter (DPF) and to operate an internal combustion engine having an electronic engine control system (ECS) with memory, and an aftertreatment exhaust system with a diesel oxidation catalyst (DOC) and said DPF, comprising:
   determining engine operational status;
   determining whether engine thermal management is operating;
   determining whether engine thermal management is required;
   discontinuing engine thermal management if not required;
   determining engine speed, engine load, vehicle speed, exhaust temperature, high idle regeneration status, and engine governor status to determine if operating condition changes are above a predetermined threshold for a predetermined period of time; and
   re-initiating thermal management.

2. The method of claim 1, wherein if thermal management is not operating, the engine control system (ECS) continues normal engine operation.

3. The method of claim 1, wherein is thermal management is required for DPF regeneration, the engine continues operation in thermal management mode.

4. The method of claim 1, wherein if engine speed, engine load, vehicle speed, engine governor status, exhaust temperature and high idle regeneration status are below a predetermined threshold for a predetermined period of time, the engine control system (ECS) reinitiates determination of engine speed, engine load, vehicle speed and governor status after a predetermined period of time has elapsed, on a continuous basis.

5. The method of claim 1, wherein said method is implemented during high idle DPF regeneration events.

6. The method of claim 1, wherein said method is implemented during highway operating DPF regeneration events.

7. The method of claim 1, wherein said thermal management operating mode is discontinued when engine speed is low, engine load is low, vehicle speed is low, exhaust temperature is below light off temperature, and high idle regeneration may or may not be operating.

* * * * *